United States Patent [19]

Davies

[11] Patent Number: 5,375,080
[45] Date of Patent: Dec. 20, 1994

[54] PERFORMING ARITHMETIC ON COMPOSITE OPERANDS TO OBTAIN A BINARY OUTCOME FOR EACH MULTI-BIT COMPONENT

[75] Inventor: Daniel Davies, Palo Alto, Calif.

[73] Assignee: Xerox Corporation, Stamford, Conn.

[21] Appl. No.: 993,213

[22] Filed: Dec. 18, 1992

[51] Int. Cl.$^5$ ............................................... G06F 7/00
[52] U.S. Cl. ................................................ 364/736.5
[58] Field of Search ...................... 364/736.5, 745, 749

[56] References Cited

U.S. PATENT DOCUMENTS

| | | | |
|---|---|---|---|
| 4,161,784 | 7/1979 | Cushing et al. | 364/749 |
| 4,474,882 | 5/1984 | Walz | 364/521 |
| 4,742,552 | 5/1988 | Andrews | 382/41 |
| 4,789,957 | 12/1988 | Niehaus et al. | 364/749 |
| 4,811,266 | 3/1989 | Woods et al. | 364/736.5 |
| 5,038,313 | 8/1991 | Kojima | 364/736.5 |
| 5,129,092 | 7/1992 | Wilson | 395/800 |
| 5,280,547 | 1/1994 | Mahoney | 382/49 |

FOREIGN PATENT DOCUMENTS

| | | | |
|---|---|---|---|
| 431961A2 | 6/1991 | European Pat. Off. | G06F 15/62 |
| 460970A2 | 12/1991 | European Pat. Off. | G06F 15/70 |
| 0464601 | 1/1992 | European Pat. Off. | |
| 0486143 | 5/1992 | European Pat. Off. | |

Primary Examiner—David H. Malzahn

[57] ABSTRACT

Binary outcome operations are performed on composite operands. A composite operand is an operand that includes plural multi-bit component data items. A binary outcome operation obtains, for each component, a flag bit that depends on the numerical value of the component. A binary outcome operation can be performed by performing an arithmetic operation in parallel on a composite operand in which each component includes more than one bit. The arithmetic operation can add a value, producing a carry signal if a component and the added value together exceed a maximum possible value. Or the arithmetic operation can subtract a value, producing a borrow signal if a component is less than the subtracted value. Also, if the arithmetic operation subtracts a value that is equal to the component, the resulting data item includes only zeros; an operation in parallel can then obtain a single flag bit that is a zero only if the resulting data item includes only zeros. The binary outcome operation can compare each component with a value or can determine whether each component is within a range.

27 Claims, 6 Drawing Sheets

PERFORMING ARITHMETIC ON COMPOSITE OPERANDS TO OBTAIN A BINARY OUTCOME FOR EACH MULTI-BIT COMPONENT

BACKGROUND OF THE INVENTION

The present invention relates to techniques that perform operations plural data items.

Many conventional techniques perform operations on plural data items. Some examples arise in the field of image processing, in which each data item can relate to a pixel in an image.

Mahoney, EP-A 460 970, describes hierarchical data analysis techniques that can be applied to pixel values. FIG. 7 shows a Connection Machine system that performs image processing by simulating a binary image jungle (BIJ). A front end processor can make calls to cause processing units in the Connection Machine to perform arithmetic and logical operations. FIG. 8 illustrates a part of an array of processing units in a Connection Machine, with a processing unit storing a pixel value. FIG. 15 illustrates how binary attributes, fullness and vacantness, can be encoded using a number indicating a level at which a transition takes place. Page 22 lines 18–19 mention that a downward attribute value could be produced by applying a criterion. FIG. 17 illustrates a technique in which an array is produced by comparing each value in an array with neighboring values. As described in relation to FIGS. 18 and 19, chunks of an image that meet a validity criterion can be found by producing an exhaustive hierarcy of data items. As described in relation to FIG. 22, a saliency criterion, such as maximum or minimum attribute value, can be used to decide from which component a pixel should take a label. Selection criteria are described at page 28 and illustrated in FIGS. 24 and 25. Page 31, beginning at line 15, describes extensions to handle color and gray shaded images.

Bloomberg et al., EP-A 431 961, describe image reduction and enlargement techniques. Page 2 line 18-page 3 line 18 and page 5 line 50-page 6 line 31 describe methods of reducing a binary image by performing logical operations between bits. Page 3 lines 36–58 describe techniques for operating on very wide pixelwords that include shifting a pixelword and then logically combining the pixelword with a shifted version of itself. The result is then compressed. Page 4 lines 43 and 44 define AND, OR, and XOR as logical operations carried out between two images on a pixel-by-pixel basis, while NOT is a logical operation carried out on a single image on a pixel-by-pixel basis.

As Bloomberg et al. note in relation to FIG. 1, a scanner may provide a gray scale image with a plurality of bits per pixel. Page 12 line 46-page 13 line 11 describe an extension in which a grayscale image is reduced to obtain a reduced grayscale image with the same number of bits/pixel by replacing the four pixel values in each 2×2 square by a single pixel with an approximate average value.

Bloomberg et al. note at page 14 lines 35–38 that their algorithms lend themselves to parallelism, with many processors independently performing thresholded reduction on parts of an image, such as bands of a given number of scanlines.

SUMMARY OF THE INVENTION

The invention deals with a problem in processing multi-bit data items, such as gray scale or color pixel values.

Operations on multi-bit data items are often conditional. For example, an item of data may be manipulated in one way if it exceeds a threshold and in another way if not. Or a data item may be manipulated only if it is equal to a given value or falls within a range. Therefore, it is often necessary to perform an operation that produces a binary value, referred to herein as a "binary outcome operation," to determine whether a data item meets a criterion.

Binary outcome operations are also useful for other purposes. For example, data items that meet a criterion can be counted by summing binary logical results over an array of data items.

Conventional techniques can be used to perform a binary outcome operation on a data item. For example, a microprocessor can perform an operation to compare two data items to determine whether they are equal or to determine whether one exceeds the other.

But in conventional techniques, a single processor can operate on only one multi-bit data item at a time. A processor cannot conventionally perform binary outcome operations in parallel on several multi-bit data items, each narrower than the processor.

The invention is based on the discovery of a technique for performing a binary outcome operation in parallel on a composite operand that includes plural multi-bit component data items. The component data items could, for example, be gray scale or color pixel values. The technique uses an arithmetic operation to produce data indicating a binary outcome for each component. The arithmetic operation could, for example, be addition or subtraction.

The technique can be implemented by operating a processor to perform an arithmetic operation on a composite operand that includes plural multi-bit component data items. The arithmetic operation produces a resulting data item for each component. A flag bit is also obtained for each component. Each flag bit indicates a binary outcome for its component.

The technique can be implemented in an article of manufacture. The article includes a data storage medium and instruction data stored by the data storage medium, which could be a magnetic storage medium, an optical storage medium, a semiconductor memory, or other memory medium. The article can be used in a system that includes memory, a storage medium access device, and a processor. The memory stores multi-bit data items; each data item could, for example, relate to a pixel of an image. The instruction data indicate arithmetic operation instructions a processor can execute to perform an arithmetic operation in parallel on a composite operand that includes more than one multi-bit component data item. Each component is in a respective subarray of processing positions in the processor, and the arithmetic operation obtains a respective resulting data item in each subarray. The instruction data also indicate flag bit instructions the processor can execute to obtain, for each component, a flag bit indicating a result of a binary outcome operation on the component. The instruction data can be, for example, code that can be executed by a microprocessor such as the CPU of a conventional workstation or other computer.

The arithmetic operation can be addition. If each component data item includes K bits, the maximum value is $2^K$. To compare with a threshhold value $T > 2^K$, a component's value can be added to $(2^K - T)$: After the resulting data item is obtained in the component's subarray, a carry signal will be provided by the subarray's most significant bit position only if the component is greater than T. If the bit position receiving the carry signal was OFF before the addition operation, it is ON after the operation, so that it contains a binary outcome or flag bit. To avoid interaction between components, a buffer bit adjacent the most significant bit position of each subarray can store the flag bit in response to the carry signal.

The arithmetic operation can also be subtraction. Adding $(2^K - T)$ in K bits is arithmetically equivalent to subtracting T in K bits, so that a borrow signal can be used to obtain a binary outcome or flag bit just as a carry signal from addition can be used.

To determine whether a component's value is in a range bounded $T_1$ and $T_2$, two thresholds can be applied, $(T_1+1)$ and $T_2$, where $T_2 > T_1$. The binary outcome can be ON only if the result with $T_2$ is OFF and the result with $(T_1+1)$ is ON. The binary outcome can be obtained by inverting the result from $T_2$ and then ANDing with the result from $(T_1+1)$.

Another way to determine whether a component's value is in a range is to subtract $T_1$, set all buffer bits, and subtract $T_2 - T_1$ from the result of the first subtraction. If a component's buffer bit is OFF, the component is in the range bounded by $T_1$ and $T_2$.

Subtraction can also be used to compare component values with a constant or other value for equality. If the result of subtracting a constant C from a component's value is zero, the component is equal to C. The binary outcome can then be obtained by horizontally subsampling the image, ORing pairs of bits at each level of subsampling. Only components equal to C will have an OFF result. Or the binary outcome can be obtained by an arithmetic operation that produces buffer bits holding the result of the equality comparison.

The technique of the invention is advantageous because it permits efficient binary outcome operations in parallel on composite operands that include plural multi-bit component data items.

The following description, the drawings, and the claims further set forth these and other aspects, objects, features, and advantages of the invention.

DETAILED DESCRIPTION

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

A "multi-bit" item of data is an item of data that includes more than one bit.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as floppy disks, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium.

A "storage medium access device" is a device that includes circuitry that can access data on a data storage medium. Examples include floppy disk drives and CD-ROM readers.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

An operation or a signal "writes" or "sets" memory circuitry or a memory cell by storing data in the memory circuitry or memory cell. If the data stored are different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" access operation by putting memory circuitry or memory cell into a state in which it can be read or written.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one-dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor. "Processing circuitry" is circuitry within a processor or processing unit that processes data. A "microprocessor" is a processor in the form of circuitry on a substrate.

A processor or other component of circuitry "operates on" an item of data by performing an operation that includes obtaining a resulting item of data that depends on the item of data operated on. For example, the resulting item of data could result from an operation that accesses the item of data operated on or from a logical or numerical operation on the item of data operated on.

An "operand" is an item of data on which an operation is performed.

An operation is performed "using an operand" when the operation is performed on the operand.

An "arithmetic operation" is an operation that obtains a numerical result that depends on the value of an operand. Addition, subtraction, multiplication, and division are examples of arithmetic operations.

A "logic operation" is an operation that obtains one bit using each bit of an operand independent of values of other bits of the operand. NOT is an example of a logic operation that uses one operand. OR, AND, and XOR are examples that use two or more operands. Some arithmetic operations can be efficiently implemented using logic operations, but others include carrying, borrowing, or shifting, making such implementation difficult.

A "binary outcome operation" is an operation that obtains a binary result that depends on the numerical value of an operand. $>$, $<$, and $=$ are examples of binary outcome operations. binary outcome operation "compares" a component data item with another value when it applies one or more of the operators $>$, $<$, and $=$ to determine how the value of the component and the other value are related.

A "flag bit" is a bit indicating a result of a binary outcome operation.

A processor or other circuitry performs an operation "in parallel" on an operand that includes plural bits when a result is obtained for all of the bits at approximately the same time. The amount of time required may, for example, be a single clock cycle of a processor.

A "composite operand" is an operand that includes two or more data items, referred to as "component data items" or "components."

A processor or other circuitry performing an arithmetic operation on a composite operand may produce an "inter-component signal." An inter-component signal is a signal like a carry signal, a borrow signal, or a shifted bit that may cause an operation on one component to affect results obtained for another component.

A "processing position" is a part of a processor or processing circuitry that can perform an operation on one bit.

"Position connecting circuitry" is circuitry that connects processing positions. For example, position connecting circuitry could connect processing positions "to form an array," such as by connecting the processing positions in pairs so that a signal from one processing position in each pair can be transferred to the other.

A "subarray of processing positions" is a subset of processing units within an array that are connected by position connecting circuitry so that the subarray can perform an arithmetic operation on a data item in parallel.

A binary number can be represented as a sum of powers of two. Each bit in the binary number indicates presence or absence of a particular power of two in the sum. Therefore, the "most significant bit" or "MSB" of a binary number is the bit that indicates presence or absence of the largest power of two and the "least significant bit" or "LSB" is the bit that indicates presence or absence of the smallest power of two. For example, if the binary number includes K bits and the powers of two in the sum range from $2^0$ to $2^{K-1}$, the MSB indicates whether the binary number is at least as great as $2^{K-1}$ and the LSB indicates whether the binary number is even or odd. In general, the MSB can indicate a binary number's sign, or, if sign is not ambiguous, whether the number is in the upper or lower half of a range of possible values.

Conventionally, the bits of a binary number are ordered in sequence from MSB to LSB or vice versa. As used herein, "left" and "leftward" arbitrarily refer to a direction toward an MSB in sequence while "right" and "rightward" arbitrarily refer to a direction toward an LSB in sequence.

The "most significant bit position" of a subarray of processing positions operating on a binary number is a position operating on the MSB of the binary number. The "least significant bit position" of a subarray of processing positions operating on a binary number is a position operating on the LSB of the binary number.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

"Code" means data indicating instructions, but in a form that a processor can execute.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "image" is a pattern of light.

An image may be divided into "segments," each of which is itself an image. A segment of an image may be of any size up to and including the whole image.

An "array of data" or "data array" or "array" is a combination of items of data that can be mapped into an array. A "two-dimensional array" is a data array whose items of data can be mapped into an array having two dimensions.

An item of data "defines" an image when the item of data includes sufficient information to produce the image. For example, a two-dimensional array can define all or any part of an image, with each item of data in the array providing a value indicating the color of a respective location of the image.

A "pixel" is the smallest segment of an image whose value is indicated in an item of data defining the image. In an array defining an image in which each item of data provides a value indicating a color, each value may be called a "pixel value". Each pixel value is a bit in the "binary form" of the image, a gray scale value in a "gray scale form" of the image, or a set, of color space coordinates in a "color coordinate form" of the image, the binary form, gray scale form, and color coordinate form each being a two-dimensional array defining the image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

A "subsampling operation" operates on an item of data that relates to part of an image to obtain another item of data relating to the same part of the image but with less data.

A first component of circuitry provides a signal to a plurality of other components of circuitry "in parallel" when all of the other components receive the signal from the first component at approximately the same time.

An operation or component of circuitry can provide or transfer an item of data to a single receiving component of circuitry "in parallel" if the item of data includes a plurality of bits and the receiving component receives all of the bits at approximately the same time.

"Control circuitry" is circuitry that provides data or other signals that determine how other components of circuitry operate. For example, "instruction circuitry" is control circuitry that provides items of data indicating instructions to a component that includes processing circuitry. Similarly, "address circuitry" is control circuitry that provides items of data indicating addresses to a component that includes memory circuitry.

A first component of circuitry "controls" a second component of circuitry when signals from the first component determine how the second component operates.

Signals "cause" or "control" an operation of a component of circuitry if the signals determine how the operation is performed.

Any two components of circuitry are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections.

"Connecting circuitry" is circuitry that connects two or more components of circuitry.

A "parallel processor" is a processor that includes more than one processing unit, each able to perform operations on data in parallel with the others.

B. General Features

Figure 1:
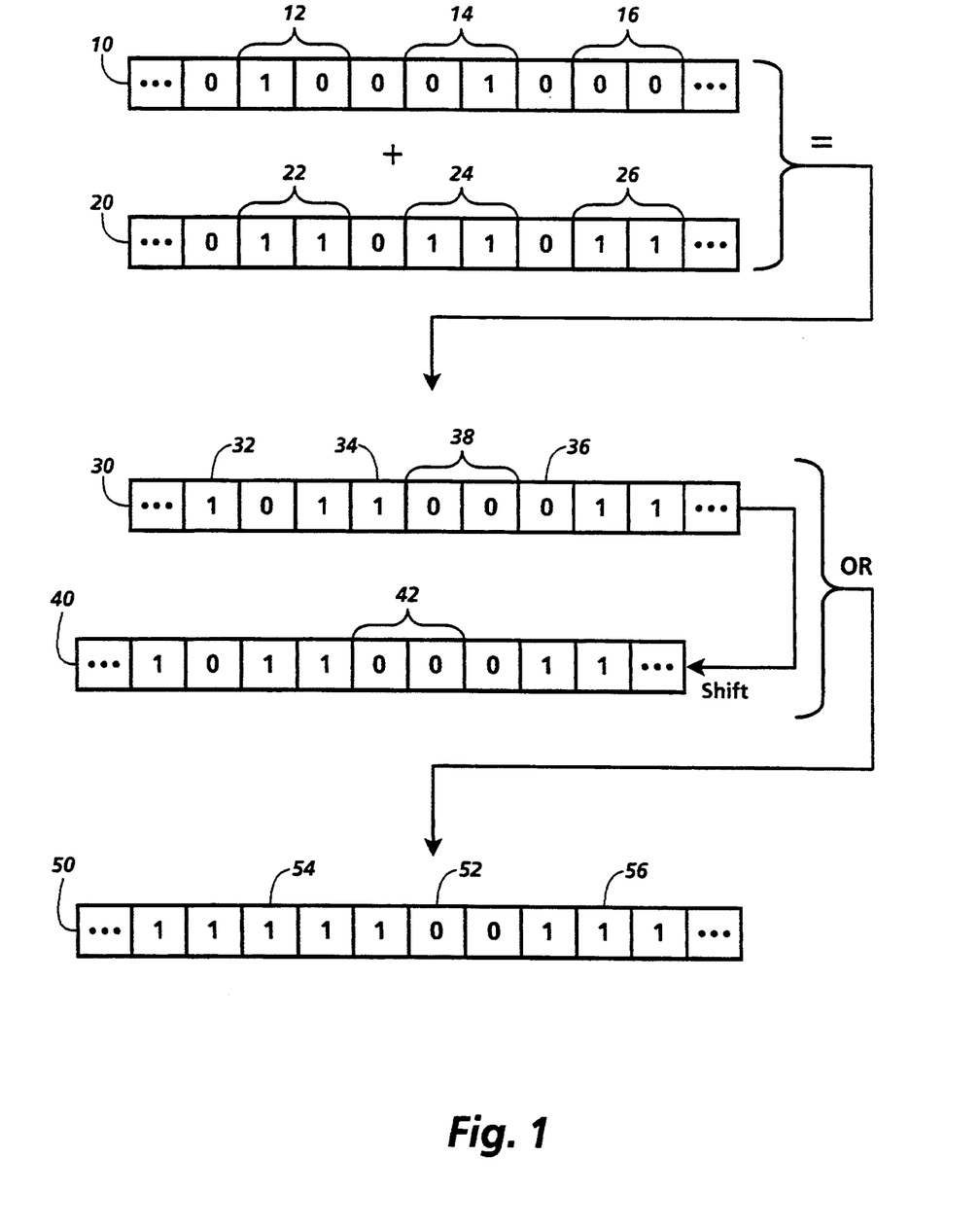
FIG. 1 is a schematic flow diagram showing examples of how an arithmetic operation can be performed in parallel to obtain flag bits indicating a result of a binary outcome operation.
Figure 2:
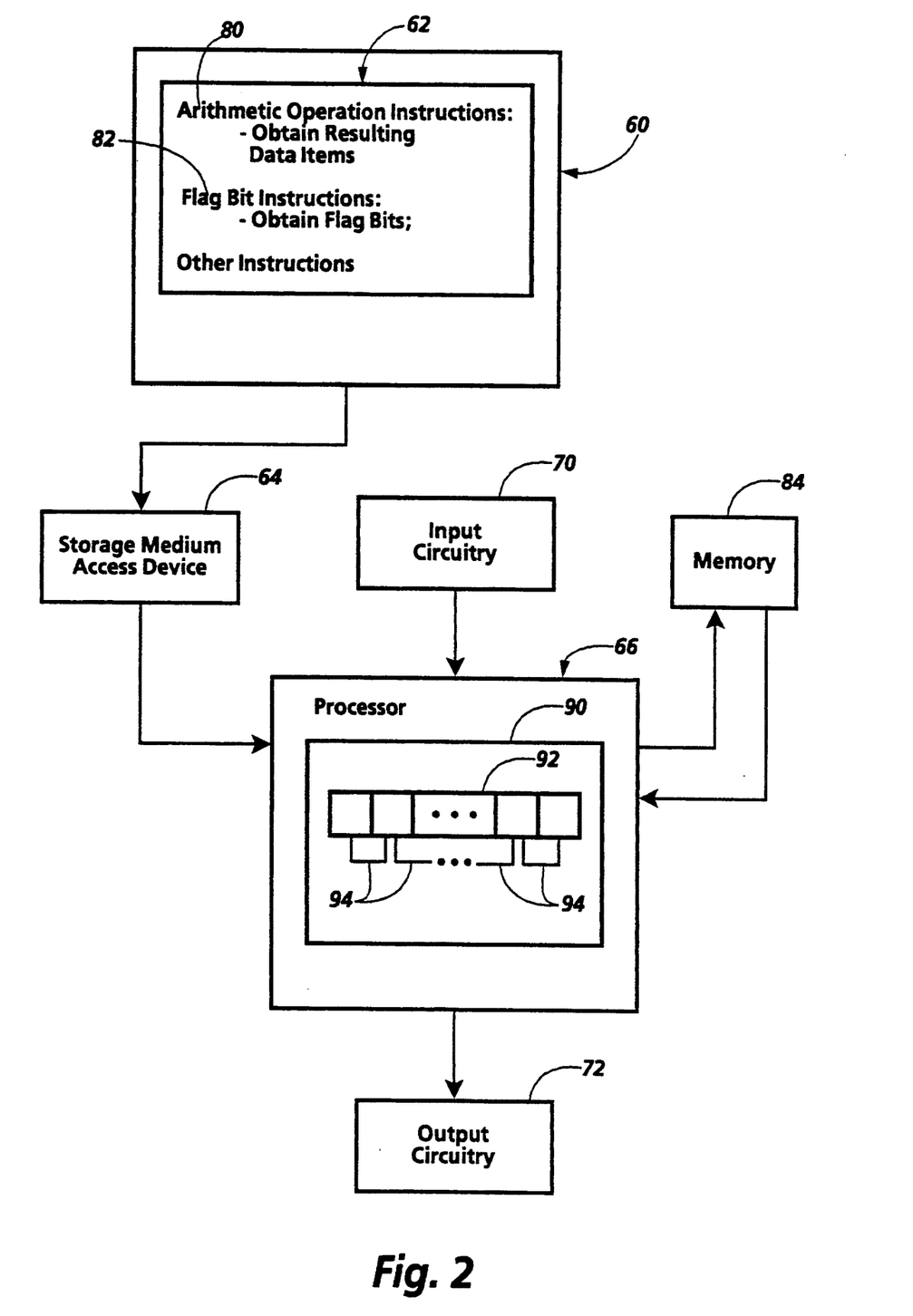
FIG. 2 is a schematic block diagram showing components of a system in which a processor can execute instructions from a software product to obtain flag bits by performing an arithmetic operation in parallel.
Figure 3:
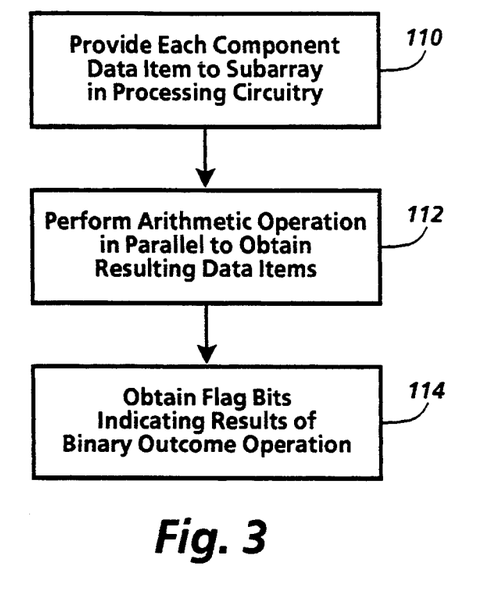
FIG. 3 is a flow chart showing general acts in obtaining flag bits by performing an arithmetic operation in parallel.

FIGS. 1–3 illustrate general features of the invention. FIG. 1 shows schematically a composite operand that includes plural multi-bit component data items; an arithmetic operation can obtain, for each component, a flag bit indicating a result of a binary outcome operation on the component. FIG. 2 shows a software product with instruction data indicating instructions a processor can perform in accordance with a technique like that in FIG. 1. FIG. 3 shows general acts in a method of operating a processor to perform an arithmetic operation in obtaining flag bits indicating results of a binary outcome operation.

In FIG. 1, composite operand 10 includes component data items 12, 14, and 16, each including two bits. Component 12 has the value 10, component 14 the value 01, and component 16 the value 00. In operand 10, each component has a cleared bit adjacent its most significant bit.

Constant operand 20 is made up of repetitions of the value 11, with one repetition aligned with each component data item in composite operand 10, and with a cleared bit adjacent its most significant bit. Adding the value 11 to a two-bit value to obtain a two-bit result is equivalent to subtracting the value 01 from the two-bit value, because $(2^2-1)=3$. But adding 11 to the two-bit value also produces a carry bit from the more significant bit if the two bit value is 01 or more.

When operand 20 is added to operand 10, two useful types of results can be obtained, as illustrated by operand 30. Bits 32, 34, and 36 indicate respectively whether components 12, 14, and 16 are at least as great as the value 01. Resulting data item 38 has the value 00, indicating that component 14 is equal to the value 01.

Bits 32, 34, and 36 are therefore flag bits, each indicating a result of a binary outcome operation on the respective one of components 12, 14, and 16. The binary outcome operation compares each component with the threshold value 01. Since component 12 is greater than 01, bit 32 has the value one. Since component 14 is equal to 01, bit 34 also has the value one. But component 16 is less than 01, so that bit 36 has the value zero.

Resulting data item 38 includes two bits, so that further acts must be performed to obtain a flag bit from it. Operand 40, obtained by shifting operand 30 leftward one bit position, includes shifted data item 42 with the same value as resulting data item 38, but with its less significant bit aligned with the more significant bit of resulting data item 38.

ORing operands 30 and 40 produces operand 50, with bit 52 a flag bit indicating a result of a binary outcome operation on component 14. The binary outcome operation compares component 14 with the value 01 for equality, and the value zero in bit 52 indicates equality. Similarly, bits 54 and 56 are flag bits with the value one indicating that components 12 and 16 are not equal to the value 01.

FIG. 2 shows software product 60, an article of manufacture that can be used in a system that includes components like those shown in FIG. 2. Software product 60 includes data storage medium 62 that can be accessed by storage medium access device 64. Data storage medium 62 could, for example, be a magnetic medium such as a set of one or more floppy disks, an optical medium such as a set of one or more CD-ROMs, semiconductor memory, or any other appropriate medium for storing data.

Data storage medium 62 stores data that storage medium access device 64 can provide to processor 66, which could for example be a microprocessor. Processor 66 is connected for receiving data from input circuitry 70. The data could be obtained from any appropriate source, such as a facsimile (fax) machine; a scanner, which could be the scanner of a digital copier or an input/output device of a computer; an editor, which could be a forms editor or other interactive image editor controlled by user input devices such as a keyboard and mouse or a pen- or stylus-based input device; or a network, which could be a local area network or other network capable of transmitting data. The data could relate to an image.

Processor 66 is also connected for providing data to output circuitry 72. The data could in turn be provided to a fax machine, a printer, a display, or a network. The printer could be the printer of a digital copier or an input/output device of a computer.

In addition to data storage medium 62, software product 60 includes data stored by storage medium 62. The stored data include instruction data indicating arithmetic operation instructions 80 and flag bit instructions 82. Processor 66 can execute instructions 80 to obtain a resulting data item for each of plural component data items in a composite operand. Processor 66 can execute instructions 82 to obtain a flag bit from each resulting data item indicating a result of a binary outcome operation on the respective component.

Processor 66 can obtain the component data items on which the arithmetic operation is performed by accessing memory 84. Each item of data can, for example, relate to a pixel of an image. The items of data can each include more than one bit. The data stored by storage medium 62 could also include data indicating instructions processor 66 can execute to store data items received from input circuitry 70 in memory 84, to retrieve data items from memory 84 for an operation or to be provided to output circuitry 72, or to store data items resulting from an operation in memory 84.

Processor 66 includes processing circuitry 90 with plural processing positions 92. Processor 66 could, for example, be a conventional microprocessor. Each of processing positions 92 can perform an operation on one bit. Processing circuitry 90 includes position connecting circuitry 94 connecting processing positions 92 in pairs to form an array. A signal from one processing position in a pair can be transferred by position connecting circuitry 94 to the other processing unit.

Each component data item in a composite operand on which an arithmetic operation is being performed can be in a respective subarray of processing positions 92. Processor 66 can execute arithmetic operation instructions 80 to obtain a resulting data item in each component's subarray. Processor can execute flag bit instructions 82 to obtain a flag bit from each resulting data item.

FIG. 3 shows general acts in a method of operating a processor with processing circuitry like processing circuitry 90 in FIG. 2. The act in box 110 provides a composite operand to processing circuitry 90, with each component data item being provided to a respective subarray of processing positions 92. The act in box 112 operates processing circuitry 90 to perform an arithmetic operation in parallel on the composite operand to obtain a resulting data item in each subarray. The act in box 114 obtains, for each component, a flag bit indicating a result of a binary outcome operation on the component. The acts in boxes 112 and 114 may occur in a single cycle, because the flag bit may be produced directly by the arithmetic operation.

C. Implementations

The general features described above in relation to FIGS. 1-3 could be implemented in many different ways with a wide variety of components and with various operations. For example, some of the general features described above have been implemented with conventional processors while others could be implemented with specially designed processors, such as a parallel processor with the features described in copending coassigned U.S. patent applications Ser. No. 07/993,218, entitled "SIMD Architecture with Bus for Transferring Data to and from Processing Units," and Ser. No. 07/993,256, entitled "SIMD Architecture for Connection to Host Processor's Bus," both incorporated herein by reference.

FIGS. 4-8 illustrate implementations of the general steps shown in FIG. 3 that are applicable for processing units that can operate in parallel on more than one data item; a number of such processing units could be used in parallel with or without position connecting circuitry between them.

1. Sign Flag Bits

Figure 4:
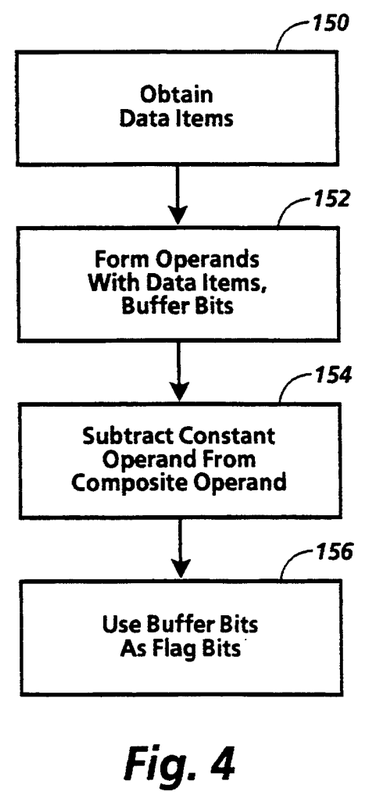
FIG. 4 is a flow chart showing operations that implement the acts in FIG. 3 to obtain sign flag bits comparing a component data item with a constant.
Figure 5:
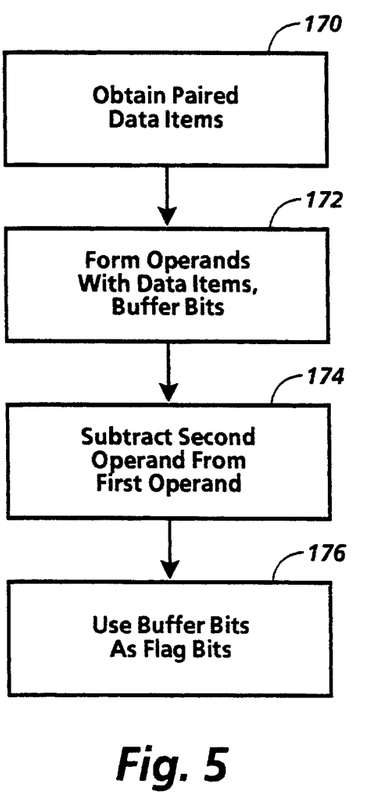
FIG. 5 is a flow chart showing operations that implement the acts in FIG. 3 to obtain sign flag bits comparing two component data items.

FIGS. 4 and 5 illustrate implementations of the general acts described in relation to FIG. 3 that obtain flag bits that indicate the sign of the result of an arithmetic operation. In FIG. 4, such flag bits also indicate a result of an arithmetic operation that compares a component data item with a threshold. In FIG. 5, such flag bits also indicate a result of an arithmetic operation comparing two components.

In FIG. 4, the act in box 150 obtains data items. Each data item could, for example, relate to a pixel of an image. The act in box 152 forms a composite operand that includes component data items obtained in box 150 and a buffer bit adjacent the most significant bit of each component data item; if the component data items were obtained from previous image processing operations, they may be obtained in box 150 in a composite operand already having this form. The act in box 152 also obtains a constant operand that includes a constant value, occurring once for each component data item in the composite operand. Each occurrence of the constant value is aligned with and of the same length as a respective component data item in the composite operand. Therefore, an arithmetic operation that subtracts the constant operand from the composite operand subtracts a threshold T from each component data item in the composite operand. The constant operand also includes a buffer bit adjacent the most significant bit of each occurrence of the constant value, aligned with the buffer bit adjacent the respective component data item in the composite operand.

The buffer bits in the composite operand and the constant operand should have values so that the results of an arithmetic operation performed on them are useful. For example, all buffer bits in the composite operand could have the value one and all buffer bits in the constant operand could have the value zero, so that the constant operand can be subtracted from the composite operand without producing inter-component signals that could invalidate results.

The act in box 154 performs an arithmetic operation subtracting the constant operand from the composite operand, so that T is subtracted from each component data item. The act in box 154 therefore produces, for each component data item that is at least as great as T, a resulting data item with an adjacent buffer bit having the value one, and, for each component data item that is less than T, a resulting data item with an adjacent buffer bit having the value zero as a result of a borrow signal.

The act in box 154 could be replaced by an arithmetic operation adding a constant to the composite operand. For example, adding $(2^K - T)$ to a K-bit component would produce a sum that is the same as the difference produced by subtracting T from the component. In this case, however, the buffer bits in both operands should have the value zero before the operation. This would produce, for each component data item that is at least as great as T, a resulting data item with an adjacent buffer bit having the value one as a result of a carry signal, and, for each component data item that is less than T, a resulting data item with an adjacent buffer bit having the value zero.

The act in box 156 uses the buffer bits adjacent the resulting data items produced in box 154 as flag bits. This act can be implemented in a number of ways.

To obtain a result that includes only the buffer bits, a subsampling operation, such as reduction, can be performed on the resulting data items, using techniques like those described in copending coassigned U.S. patent application Ser. No. 07/993,939, entitled "Subsampling or Spreading Circuitry for SIMD Architecture," incorporated herein by reference. If each component data item with buffer bit includes K bits, then a (K+1):1 reduction could be performed, or $\log_2(K+1)$ 2:1 reductions could be performed, each saving the more significant bit of each pair of bits. The buffer bits thus form a bitmap having a one in each bit relating to a pixel for which the component data item was at least as great as T and a zero in each bit for which the component data item was less than T.

To obtain a result that can be used to control further processing of multi-bit component data items, the buffer bits can be used to generate a mask, using techniques like those described in copending coassigned U.S. patent application Ser. No. 07/993,938, entitled "Masks for Selecting Multi-bit Components in a Composite Operands," incorporated herein by reference.

In FIG. 5, the act in box 170 obtains pairs of data items. For example, two data items could be paired because both relate to the same pixel of an image, or they could be paired because the pixels to which they relate are from two different images but are aligned when one image is superimposed on the other during image processing.

The act in box 172 forms first and second composite operands, with each pair of data items obtained in box 170 being divided, one in the first composite operand and the other in the second. Each composite operand includes component data items and a buffer bit adjacent the most significant bit of each component data item; if the component data items were obtained from previous image processing operations, they may be received in box 170 in composite operands having this form. Paired component data items are aligned with each other and of the same length so that an arithmetic operation that subtracts the second operand from the first operand subtracts each component data item in the second operand from its paired component data item in the first operand. The buffer bits are similarly aligned and have the value one in the first operand and zero in the second operand. As noted in relation to FIG. 4, if an equivalent addition is performed, all buffer bits should have the value zero.

The act in box 174 performs an arithmetic operation subtracting the second operand from the first operand, so that each component data item in the second operand is subtracted from its paired component data item in the first operand. The act in box 174 therefore produces, for each component data item in the first operand that is at least as great as its paired component data item, a resulting data item with an adjacent buffer bit having the value one, and, for each component data item in the first operand that is less than its paired component data item, a resulting data item with an adjacent buffer bit having the value zero, as a result of a borrow signal.

The act in box 176 uses the buffer bits adjacent the resulting data items produced in box 174 as flag bits. This act can be implemented as described above in relation to box 156 in FIG. 4. In particular, to obtain the maximum of each pair of component data items, a first mask can be produced from the buffer bits so that the mask includes zeros in the positions where the component data item in the second operand is equal to or greater than its paired component data item and one in positions where the component data item in the first operand is greater. The first mask can be ANDed with the first operand to produce a masked version of the first operand. The first mask can also be inverted to produce a second mask that is ANDed with the second operand to produce a masked version of the second operand. The masked versions of the first and second operands can then be ORed to obtain a result with the maximum in each position. Conversely, the first mask can be ANDed with the second operand and the second mask with the first operand, to produce masked versions that can be ORed to obtain a result with the minimum in each position.

2. Zero Flag Bits

Figure 6:
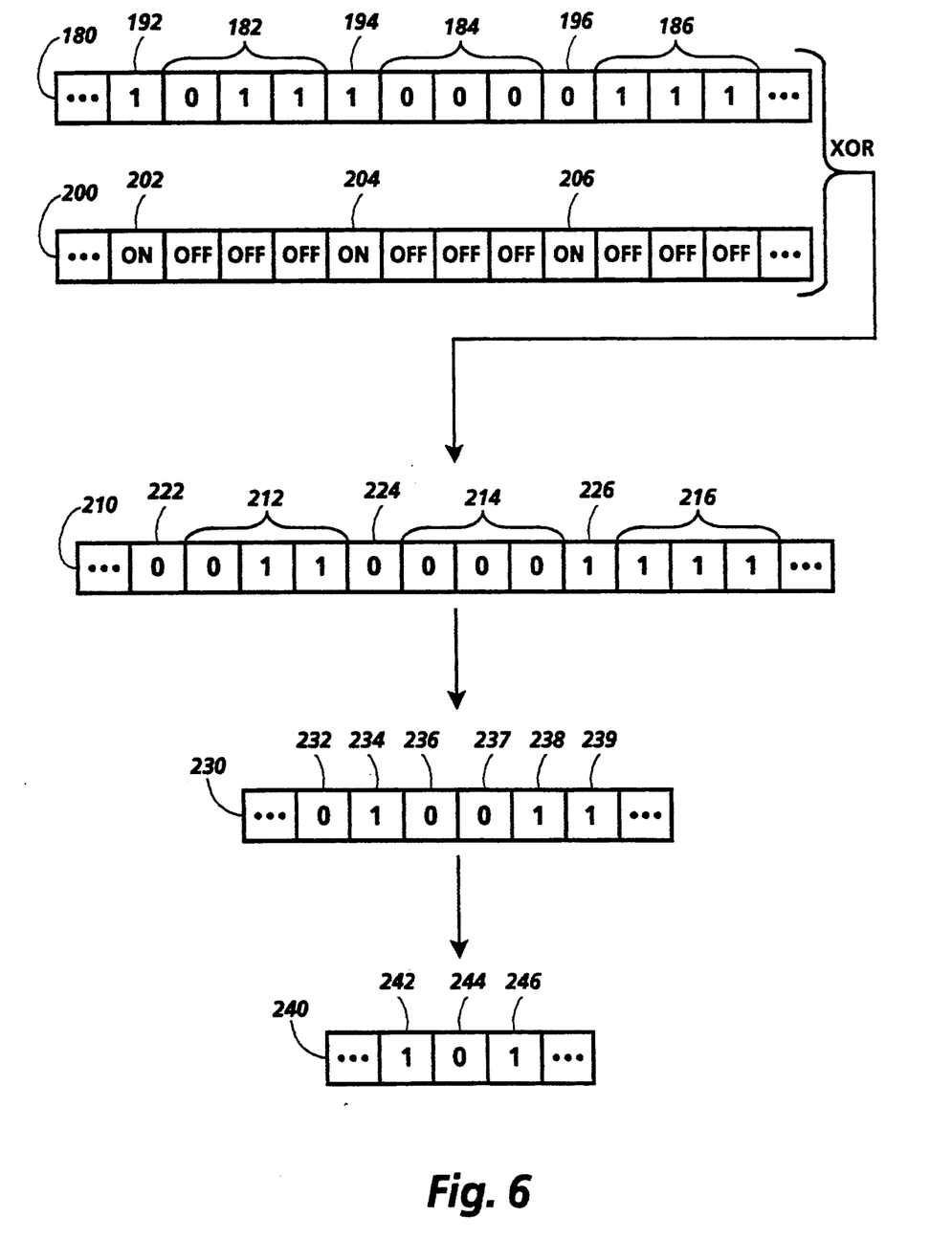
FIG. 6 is a schematic flow diagram showing operations that implement the acts in FIG. 3 to obtain zero flag bits with subsampling operations.
Figure 7:
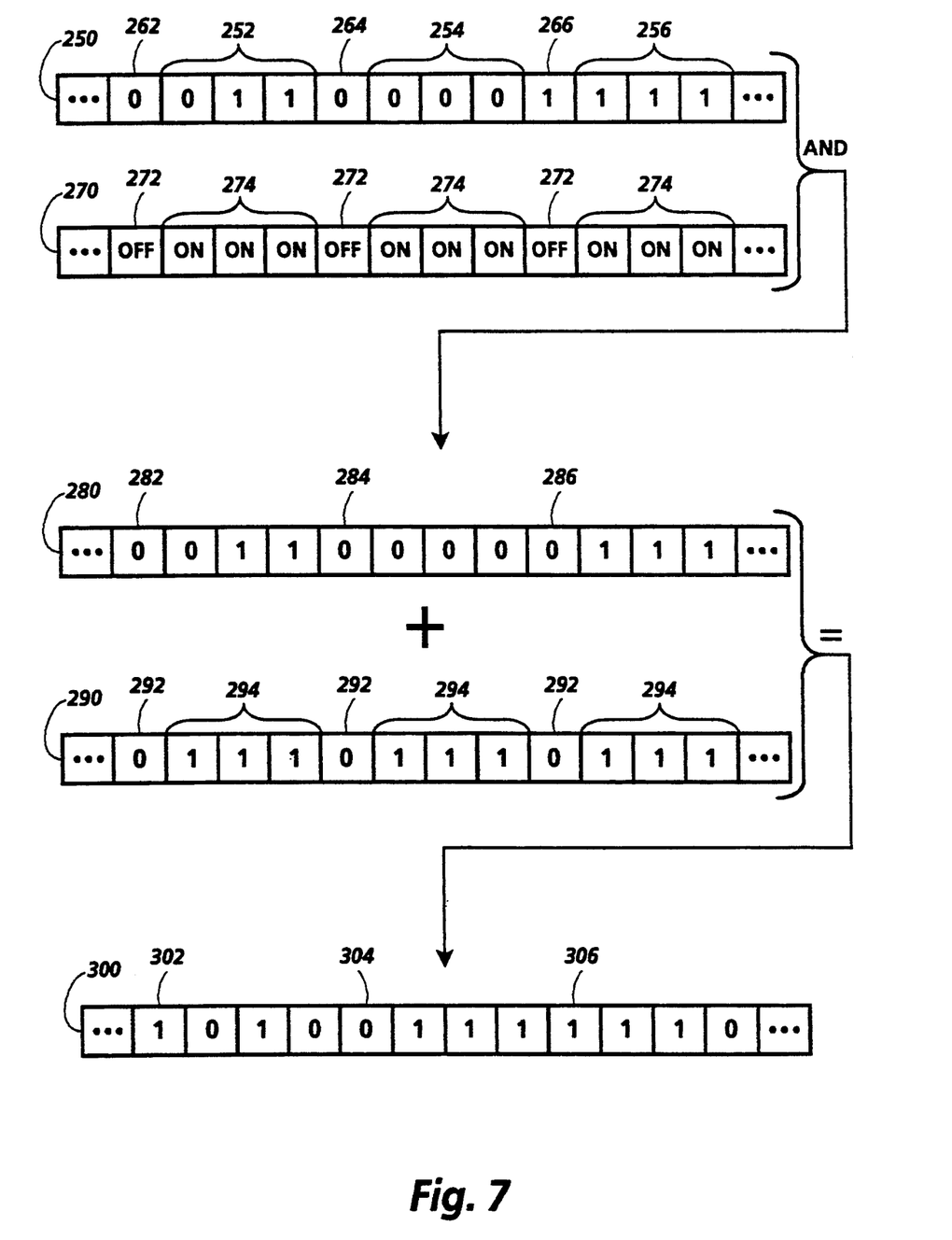
FIG. 7 is a schematic flow diagram showing operations that implement the acts in FIG. 3 to obtain zero flag bits with arithmetic and logic operations.

FIGS. 6 and 7 illustrate two implementations of the general act described in relation to FIG. 3 that obtain flag bits that indicate whether the result of an arithmetic operation is zero. In FIG. 6, such flag bits are obtained by reduction. In FIG. 7, such flag bits are obtained by an additional operation in parallel.

FIGS. 6 and 7 can both begin with results obtained from the act in box 154 in FIG. 4. In other words, in both implementations, a constant operand is subtracted from a composite operand to obtain a result. The result will have a value with all zeros only in positions where a component data item is equal to the constant, and will have values with all ones or with mixed ones and zeros elsewhere. The adjacent buffer bit will have a one if the component data item was at least as great as the constant and a zero elsewhere. The result can then be used to obtain flag bits as illustrated in FIGS. 6 and 7.

In FIG. 6, operand 180 includes resulting data items 182, 184, and 186, with respective buffer bits 192, 194, and 196. As shown, data item 182 resulted from subtracting the constant value from a greater component data item, with data item 182 indicating a difference not equal to zero and with buffer bit 192 indicating a positive result. Similarly, data item 184 resulted from subtracting the constant value from an equal component data item, with data item 184 indicating a difference equal to zero and with buffer bit 194 indicating a positive result. And data item 186 resulted from subtracting the constant value from a smaller component data item, with data item 186 indicating a difference not equal to zero and with buffer bit 196 indicating a negative result.

To invert buffer bits, an XOR operation is performed on operand 180 and operand 200, in which bits 202, 204, and 206 and all other bits aligned with buffer bits have the value ON and all bits not aligned with buffer bits have the value OFF. The XOR operation therefore produces operand 210, in which data items 212, 214, and 216 have the same values respectively as data items 182, 184, and 186 in operand 180, but in which buffer bits 222, 224, and 226 are the inverses respectively of buffer bits 192, 194, and 196.

The implementation of FIG. 6 performs a subsampling operation on operand 210 to obtain operand 230. The subsampling operation can include shifting operand 210 one bit position leftward, then ORing operand 210 with the shifted version as discussed above in relation to FIG. 1, then subsampling the result with a 2:1 reduction selecting the more significant bit of each pair to obtain operand 230. The subsampling could be performed using techniques like those described in copending coassigned U.S. patent application Ser. No. 07/993,939, entitled "Subsampling or Spreading Circuitry for SIMD Architecture," incorporated herein by reference. Subsampling can also be performed using operand 210 as an index into a table that contains operand 230.

Bit 232 is obtained by ORing buffer bit 222 with the most significant bit of component 212. Bit 234 is obtained by ORing the two least significant bits of component 212. Bit 236 is obtained by ORing buffer bit 224 with the most significant bit of component 214. Bit 237 is obtained by ORing the two least significant bits of component 214. Bit 238 is obtained by ORing buffer bit 226 with the most significant bit of component 216. Bit 239 is obtained by ORing the two least significant bits of component 216.

Then, the implementation of FIG. 6 performs another subsampling operation on operand 230 to obtain operand 240. Bit 242 is obtained by ORing bits 232 and 234; bit 244 by ORing bits 236 and 237; and bit 246 by ORing bits 238 and 239. Bits 242, 244, and 246 are flag bits indicating that resulting data item 184 indicated a zero result while data items 182 and 186 indicated results not equal to zero.

Operand 250 in FIG. 7 is identical to operand 210 in FIG. 6, with data items 252, 254, and 256 and buffer bits 262, 264, and 266. Operand 250 is first ANDed with mask 270, which has OFF values 272 to clear the buffer bits and ON values 274 elsewhere. Therefore, operand 280 has cleared buffer bits 282, 284, and 286.

Operand 280 is then added to a constant operand 290 with cleared buffer bits 292 and with constant values 294 that include all ones. Operand 300 includes the resulting data items and buffer bits 302, 304, and 306, which are flag bits having the same values respectively as bits 232, 234, and 236 in FIG. 6. These flag bits could be used as described above in relation to box 156 in FIG. 4.

Since it does not need information from buffer bits to obtain flag bits and does not use buffer bits as flag bits, the implementation of FIG. 6 could also be applied to resulting data items without buffer bits, which could be obtained using some of the techniques described in copending coassigned U.S. patent application Ser. No. 07/993,925, entitled "Performing Arithmetic in Parallel on Composite Operands with Packed Multi-bit Components," incorporated herein by reference. The implementation of FIG. 7 does not require information from the buffer bits, but uses buffer bits as flag bits, so that if resulting data items do not have buffer bits, buffer bits must be inserted.

If each resulting data value plus buffer bit included K bits, it would also be possible to obtain buffer bit flags by a series of $(K-1)$ shift and OR operations of the type discussed above in relation to FIG. 1. In comparison, the implementation of FIG. 6 can be performed in $\log_2 K$ shift and OR operations and $\log_2 K$ subsampling operations, which is advantageous for larger values of K if rapid subsampling operations are available. And the implementation of FIG. 7 can be performed in two operations as shown provided that operands 270 and 290 are available. The choice of how to implement operations obtaining zero flag bits can therefore be based on considerations that include processor capabilities and efficiency.

3. Range Flag Bits

Figure 8:
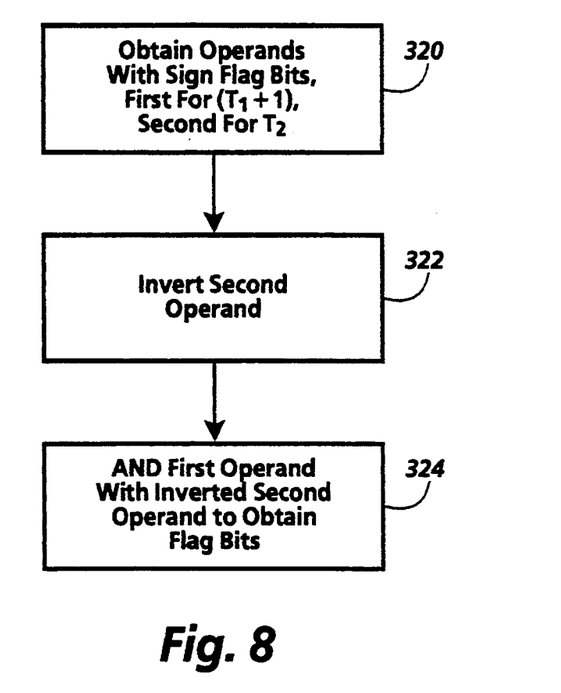
FIG. 8 is a flow chart showing operations that implement the acts in FIG. 3 to obtain range flag bits.
Figure 9:
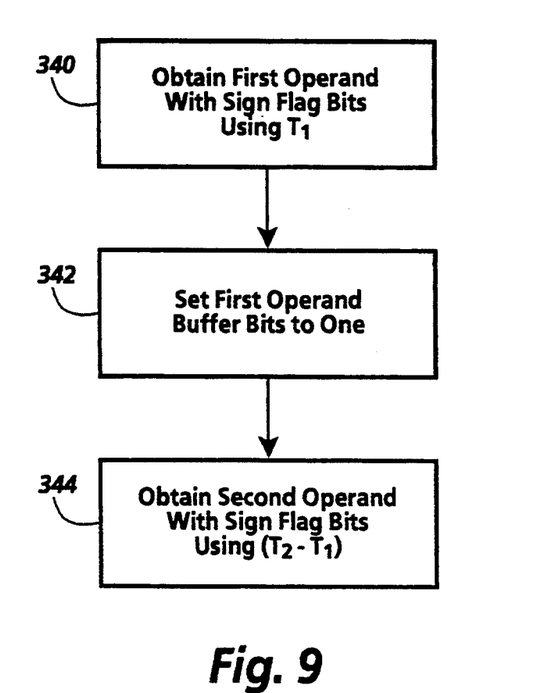
FIG. 9 is another flow chart showing operations that implement the acts in FIG. 3 to obtain range flag bits.

FIGS. 8 and 9 illustrate two implementations, each of which obtains range flag bits indicating whether each component data item is in a range.

In FIG. 8, the act in box 320 performs two operations as described above in relation to FIG. 4 on a composite operand to obtain first and second sign flag bits for each component data item. One operation uses a constant value ($T_1+1$) and the other a constant value $T_2$, where $T_2>T_1$. As a result, a component's first flag bit indicates whether the component is as great as ($T_1+1$) and its second flag bit indicates whether the component is as great as $T_2$. The first flag bits of the components in the composite operand are in a first operand and the second flag bits are in a second operand.

The act in box 322 inverts the second operand. A component whose inverted second flag bit has a value of one is less than $T_2$, while a component whose first flag bit has a value of one is greater than $T_1$.

The act in box 324 ANDs the first operand and the inverted second operand to produce range flag bits, each indicating whether a component is in the range between $T_1$ and $T_2$. A component's range flag bit has a value of one if the component is in the range and a value of zero if it is not.

The constant values ($T_1+1$) and $T_2$ can be used in the implementation of FIG. 8 to obtain range flag bits for an open range bounded by $T_1$ and $T_2$, a closed range bounded by ($T_1+1$) and ($T_2-1$), or a range that is open at one end and closed at the other.

In FIG. 9, the act in box 340 performs an operation as described above in relation to FIG. 4 on a composite operand to obtain a first operand with a sign flag bit for each component data item. The operation uses a constant value $T_1$, subtracting it from each component data item. As a result, a component's flag bit in the first operand indicates whether the component is as great as $T_1$. In addition, each component's resulting data item in the first operand has a value that is shifted downward by $T_1$, with components that were less than $T_1$ being shifted to values between $2^K$ and ($2^K-T_1$).

The act in box 342 operates on the first operand to set all the buffer bits to the value one. This prepares for a subtraction operation.

The act in box 344 then performs another operation as described in relation to FIG. 4 to obtain a second operand with a sign flag bit for each component data item. This operation subtracts the constant value ($T_2-T_1$) from each component's resulting data item in the first operand, as modified by box 342. As a result, a component's flag bit in the second operand indicates whether the component is in the range between $T_1$ and $T_2$, where $T_2>T_1$. If a component is in the range, its sign flag bit in the second operand has the value zero, because of a borrow signal. If the component is above or below the range, its sign flag bit in the second operand has the value one.

As in FIG. 8, the implementation of FIG. 9 could be used with open or closed ranges.

D. Applications

The general implementation features described above could be used in a wide variety of data processing applications. They are expected to be particularly useful, however, in performing some types of image processing more rapidly than they could be performed serially on each data item. In particular, the features described above could be used to implement techniques similar to those described in Serra, J., *Image Analysis and Mathematical Morphology*, Academic Press, 1982 and Serra. J., *Image Analysis and Mathematical Morphology*, Volume 2: *Theoretical Advances*, Academic Press, 1988. Such techniques may be used, for example, to provide document services, such as removal of noise or other noninformative features, skew correction, data encoding, extraction of segments for automatic form or control sheet creation, and printer specific correction. Such document services can be used in digital copying machines, including fax machines and photocopying machines, in machines that produce data defining an image for a printer or other image output device, in machines that operate on data defining an image received from a scanner or other image input device, and in other machines that perform image processing.

The features described above can be used to obtain flag bits for gray scale or color pixel values during a wide variety of image processing operations.

The general implementation features described above may also be useful in various other applications, such as searching an image database for images containing a particular set of features; scanning envelopes for addresses; interpreting forms from a high-speed scanner; machine vision; and process-specific print image correction and verification.

The invention could also be applied to perform various other image processing operations, such as pixel counting, gray scale morphology, gray scale rotation, generating error-diffused images, and skew detection.

The invention could also be used with data that does not relate to an image. The invention could be used, for example, to perform finite difference analysis or simulations of physical phenomena.

E. Miscellaneous

The invention has been described in relation to several implementations. The invention might also be implemented by using two or more of the implementations together or by performing logic operations on flag bits obtained from two or more implementations to obtain combined flag bits.

The invention has been described in relation to implementations in which component data items in a composite operand are separated by single buffer bits. The invention could also be implemented with plural buffer bits between components.

The invention has been described in relation to implementations that obtain flag bits using addition and subtraction. It might also be possible to obtain flag bits using other arithmetic operations.

The invention has been described in relation to implementations that operate on data relating to images, but might also be implemented to operate on data that do not relate to an image.

The invention has been described in relation to implementations with conventional microprocessors, but the invention might also be implemented with reduced instruction set (RISC) chips or with any other processor, including the processor of a mainframe computer, minicomputer, supercomputer, or any other computing device.

The invention has been described in relation to a software product for use in a system that includes a processor and memory, with the software product storing data indicating instructions the processor can execute to perform operations on data from memory. The system's memory can, of course, include the software product when in use in the system, and instructions and data can, in general, be arbitrarily stored in any memory device accessible by the processor; for example, the invention can readily be implemented with data indicating instructions stored in memory rather than in a software product.

The invention has been described in relation to composite operands with simple structures. In the examples described above, all component data items are of the same length and the components within a composite operand need not be related to each other. The invention could also be implemented with composite operands with additional structure, within the limitations of processor width. For example, a composite operand could include component data items of different widths, provided that other operands are aligned with components of the same widths in the same positions. Also, the component data items could be arranged in groups of two or more, with the components in each group being related: If the components in each group relate to the same pixel, each component could hold a value for a respective threshold reduction. More generally, if the components in each group relate to the same location in a physical simulation space, one component could hold a value for the location and the other locations could hold derivatives at the location.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a processor;
   the processor including processing circuitry for performing arithmetic operations; the processing circuitry having four or more processing positions, each for performing operations on one bit; the processing circuitry comprising position connecting circuitry connecting the processing positions to form an array of processing positions;
   the method comprising:
   providing to the processing circuitry first and second composite operands; each of the first and second composite operands including two or more component data items, each including more than one bit; each component data item being provided to a respective subarray of processing positions in the array; the component data items of the first and second composite operands being aligned and positioned in subarrays that are separated by flag bit positions so that each subarray has an adjacent flag bit position;
   operating the processor to perform an arithmetic operation in parallel on the first and second composite operands; the arithmetic operation obtaining, in each subarray, a respective resulting data item that includes more than one bit and, in each flag bit position adjacent a subarray, a flag bit indicating a result of a binary outcome operation on the component data items in the subarray.

2. The method of claim 1 in which the binary outcome operation compares each component data item in the first composite operand with a threshold.

3. The method of claim 1 in which the binary outcome operation determines whether each component data item in the first composite operand is in a range.

4. The method of claim 1 in which the binary outcome operation compares each component data item in the first composite operand with a value for equality.

5. The method of claim 1 in which the arithmetic operation is addition.

6. The method of claim 5 in which each resulting data item includes a most significant bit; the flag bit for each component data item indicating whether a carry occurred from the most significant bit of the respective resulting data item.

7. The method of claim 5 in which each component data item includes K bits; the binary outcome operation comparing each component data item with a value T; the arithmetic operation adding $(2^K - T)$ to each component data item.

8. The method of claim 1 in which the arithmetic operation is subtraction.

9. The method of claim 8 in which each resulting data item includes a most significant bit; the flag bit for each component data item indicating whether a borrow occurred into the most significant bit of the respective resulting data item.

10. The method of claim 8 in which each component data item includes K bits; the binary outcome operation comparing each component data item with a value T; the arithmetic operation subtracting T from each component data item.

11. The method of claim 1 in which each component data item in the first composite operand relates to a respective pixel of an image.

12. The method of claim 11 in which each component data item in the first composite operand is a gray scale pixel value.

13. The method of claim 11 in which each component data item in the first composite operand is a color pixel value.

14. The method of claim 1 in which each component data item in the second composite operand has a constant value.

15. A method of operating a processor;
    the processor including processing circuitry for performing arithmetic operations; the processing circuitry having four or more processing positions, each for performing operations on one bit; the processing circuitry comprising position connecting circuitry connecting the processing positions to form an array of processing positions;
    the method comprising:
    providing to the processing circuitry first and second composite operands; each of the first and second composite operands including two or more component data items, each including more than one bit; each component data item being provided to a respective subarray of processing positions in the array; the component data items of the first and second composite operands being aligned and positioned in subarrays;
    operating the processor to perform an arithmetic operation in parallel on the first and second composite operands; the arithmetic operation obtaining, in each subarray, a respective resulting data item that includes more than one bit; and
    operating the processor to use the resulting data item in each subarray to obtain a flag bit indicating a result of a binary outcome operation on the component data items in the subarray.

16. The method of claim 15 in which each component data item in the second composite operand has a constant value.

17. The method of claim 15 in which the bits of the resulting data item of a component data item all have a first value; the act of operating the processor to use the resulting data item in each subarray to obtain a flag bit comprising:

performing a subsampling operation on the resulting data item to obtain one bit having the first value.

18. The method of claim 15 in which the binary outcome operation compares each component data item in the first composite operand with a threshold.

19. The method of claim 15 in which the binary outcome operation determines whether each component data item in the first composite operand is in a range.

20. The method of claim 15 in which the binary outcome operation compares each component data item in the first composite operand with a value for equality.

21. The method of claim 15 in which the arithmetic operation is addition.

22. The method of claim 21 in which each component data item includes K bits; the binary outcome operation comparing each component data item with a value T; the arithmetic operation adding $(2^K-T)$ to each component data item.

23. The method of claim 15 in which the arithmetic operation is subtraction.

24. The method of claim 23 in which each component data item includes K bits; the binary outcome operation comparing each component data item with a value T; the arithmetic operation subtracting T from each component data item.

25. The method of claim 15 in which each component data item in the first composite operand relates to a respective pixel of an image.

26. The method of claim 25 in which each component data item in the first composite operand is a gray scale pixel value.

27. The method of claim 25 in which each component data item in the first composite operand is a color pixel value.

* * * * *